(12) United States Patent
Porco et al.

(10) Patent No.: US 11,686,221 B2
(45) Date of Patent: Jun. 27, 2023

(54) AIRCRAFT ENGINE REPAIR TOOL AND METHOD FOR REMOVAL AND INSTALLATION OF A MID TURBINE FRAME IN AN AIRCRAFT ENGINE

(71) Applicant: PRATT & WHITNEY CANADA CORP., Longueuil (CA)

(72) Inventors: Carlo Porco, King City (CA); Geoffrey Henriksen, Mississauga (CA); Jason Wedemire, Erin (CA); Anthony Mathias, Kettleby (CA); Michael Hunze, Ancaster (CA); Louis Lavoie, Brampton (CA); Marven Paynter, Millgrove (CA); Dennis Wilkinson, Barrie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/539,785

(22) Filed: Dec. 1, 2021

(65) Prior Publication Data
US 2023/0167753 A1 Jun. 1, 2023

(51) Int. Cl.
*F01D 25/28* (2006.01)
*F01D 25/24* (2006.01)

(52) U.S. Cl.
CPC ........... *F01D 25/285* (2013.01); *F01D 25/24* (2013.01); *F05D 2220/323* (2013.01); *F05D 2230/72* (2013.01); *F05D 2230/80* (2013.01)

(58) Field of Classification Search
CPC ........ B23P 19/04; F01D 25/28; F01D 25/285; F05D 2230/72; F05D 2230/80
See application file for complete search history.

(56) References Cited

U.S. PATENT DOCUMENTS

| 8,061,969 B2 | 11/2011 | Durocher et al. |
| 9,694,482 B2 | 7/2017 | Thomas |
| 9,970,324 B2 | 5/2018 | Tailpied et al. |

(Continued)

FOREIGN PATENT DOCUMENTS

CN 111376016 B 3/2021

OTHER PUBLICATIONS

European Patent Office, Communication re. extended European search report for European patent application No. 22210970.4, dated Apr. 18, 2023.

*Primary Examiner* — Christopher J Besler
(74) *Attorney, Agent, or Firm* — Norton Rose Fulbright Canada LLP

(57) ABSTRACT

An aircraft engine repair tool for installing and/or removing a mid turbine frame from a gas turbine engine is provided. The tool includes a stabilizer configured to support a shaft via a load path different from a load path provided by the mid turbine frame rotatably supporting the shaft about a rotation axis. The tool includes a holder attachable to the mid turbine frame, and a guide movably engageable with the shaft and attachable to the holder. The guide guides movement of the holder and of the mid turbine frame relative to the shaft along the rotation axis, and prevents movement of the holder and the mid turbine frame relative to the shaft transverse to the rotation axis when the mid turbine frame is released from the support structure and attached to the holder, and when the holder is attached to the guide.

8 Claims, 14 Drawing Sheets

(56) References Cited

U.S. PATENT DOCUMENTS

| | | |
|---|---|---|
| 2015/0107107 A1 | 4/2015 | Tailpied et al. |
| 2017/0107858 A1* | 4/2017 | Murphy .................... F02C 7/20 |
| 2020/0131908 A1 | 4/2020 | Luinaud et al. |
| 2020/0230754 A1 | 7/2020 | Gastal et al. |
| 2020/0347752 A1 | 11/2020 | Porco et al. |
| 2022/0048647 A1 | 2/2022 | Henriksen et al. |

* cited by examiner

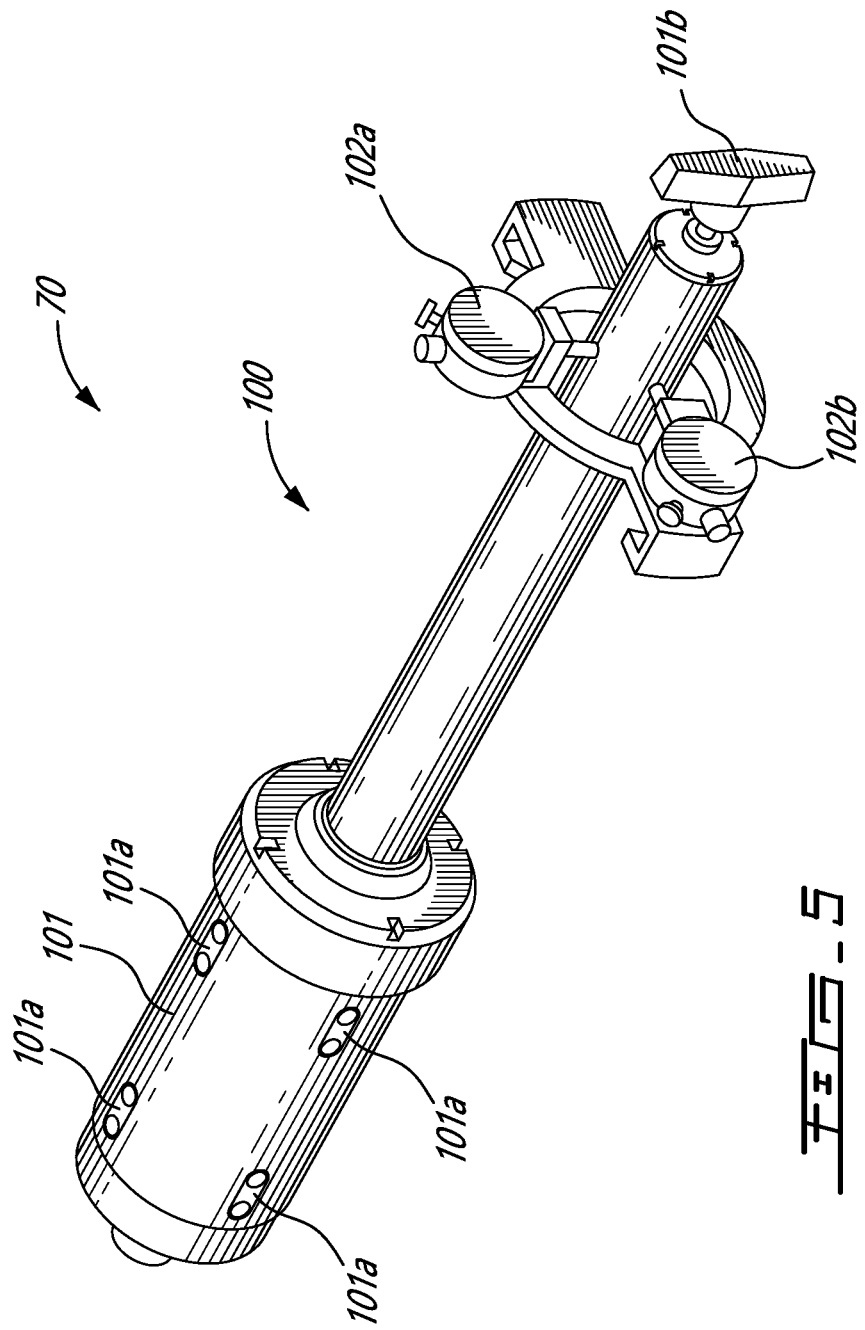

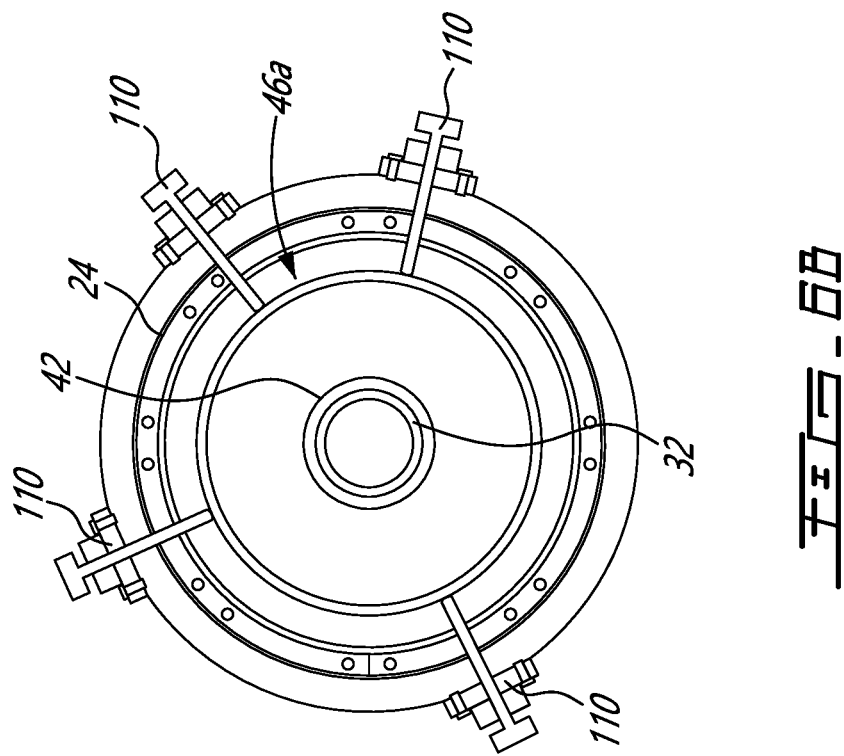
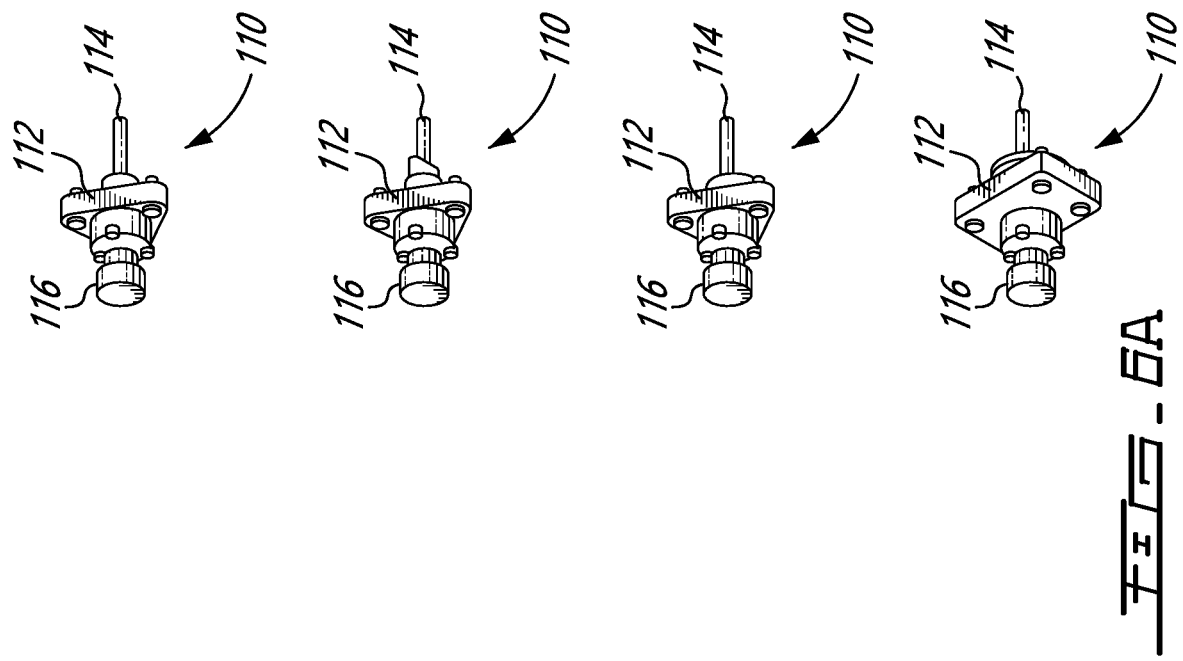

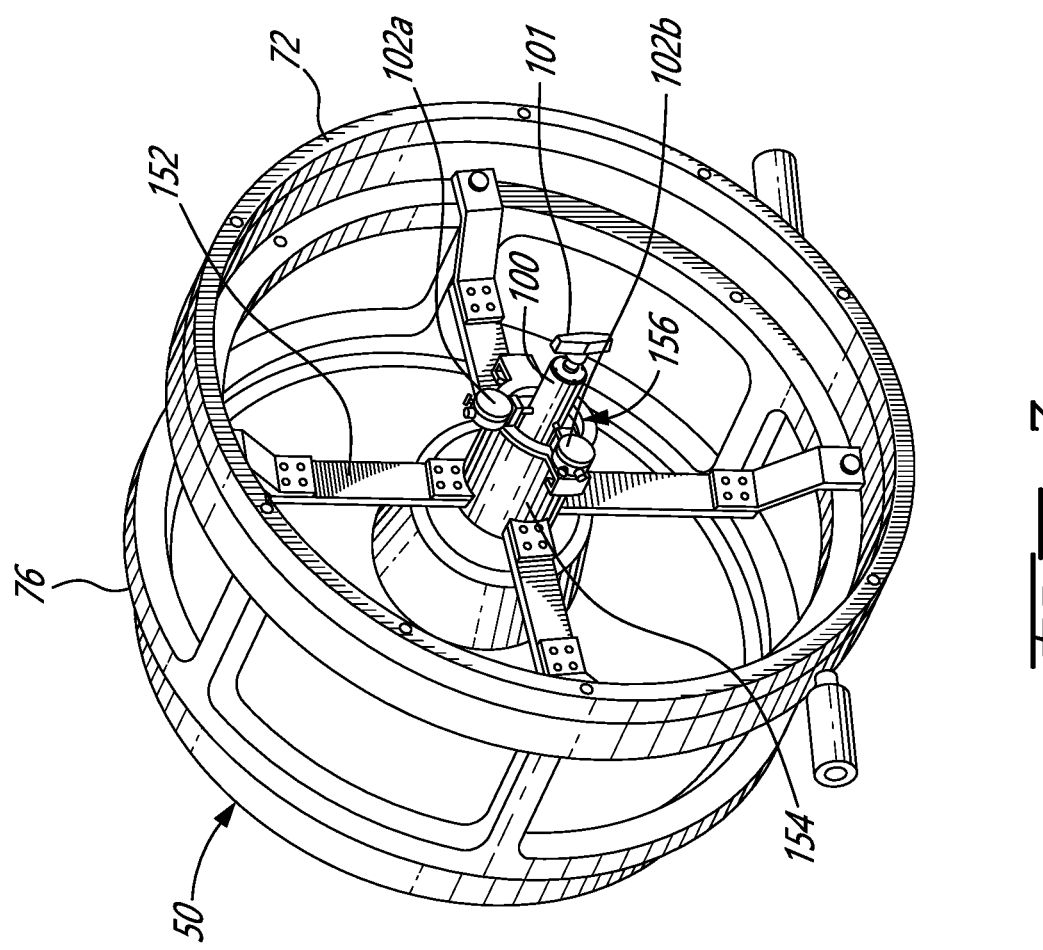

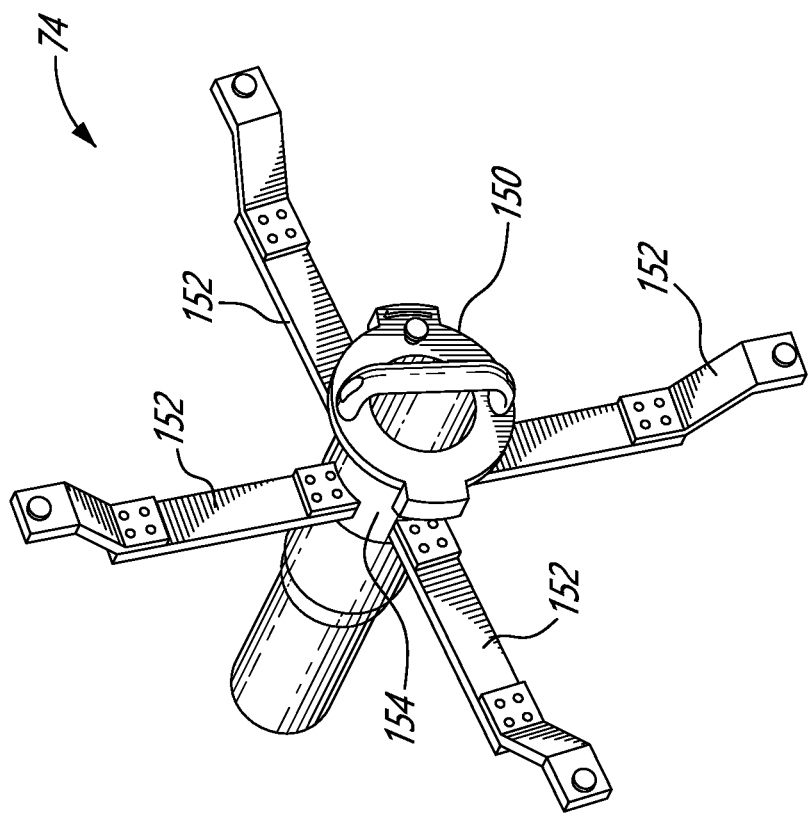

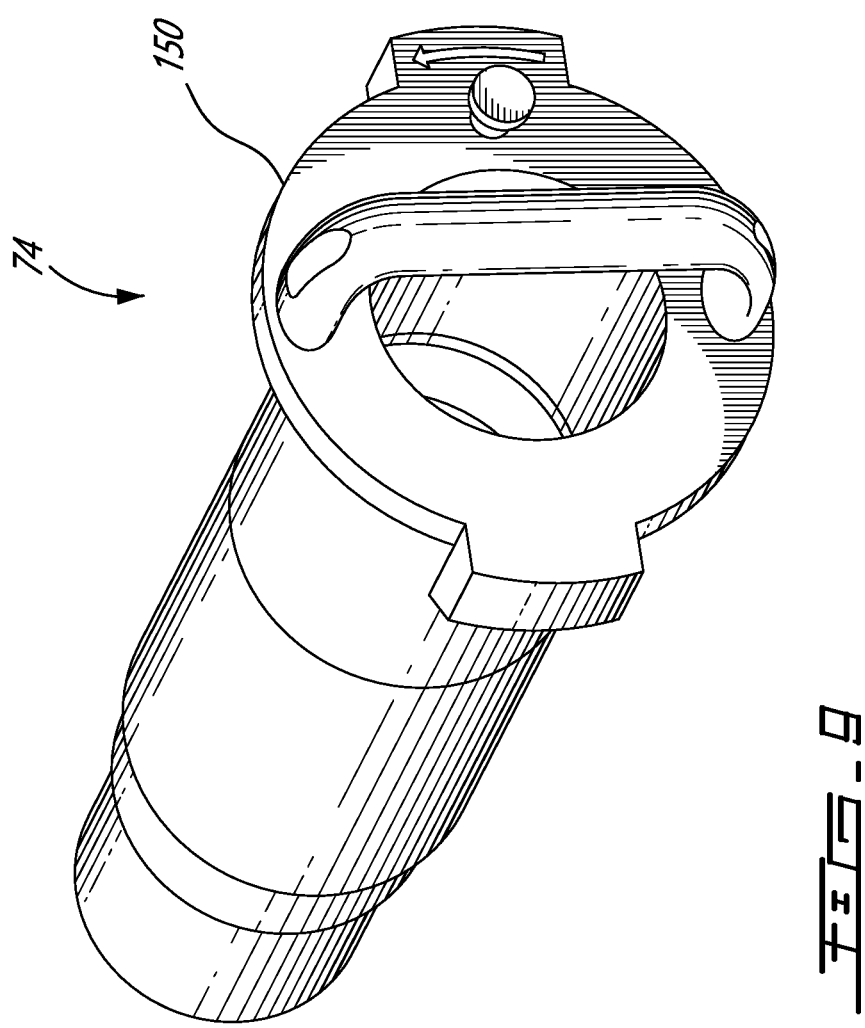

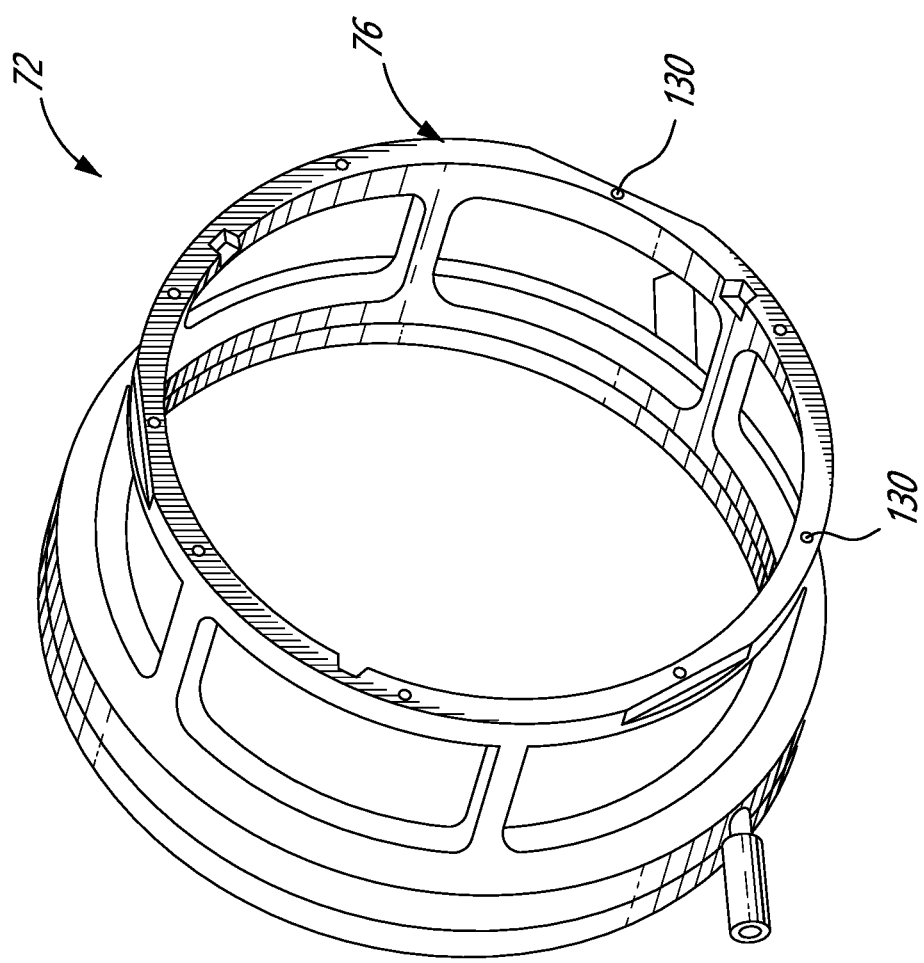

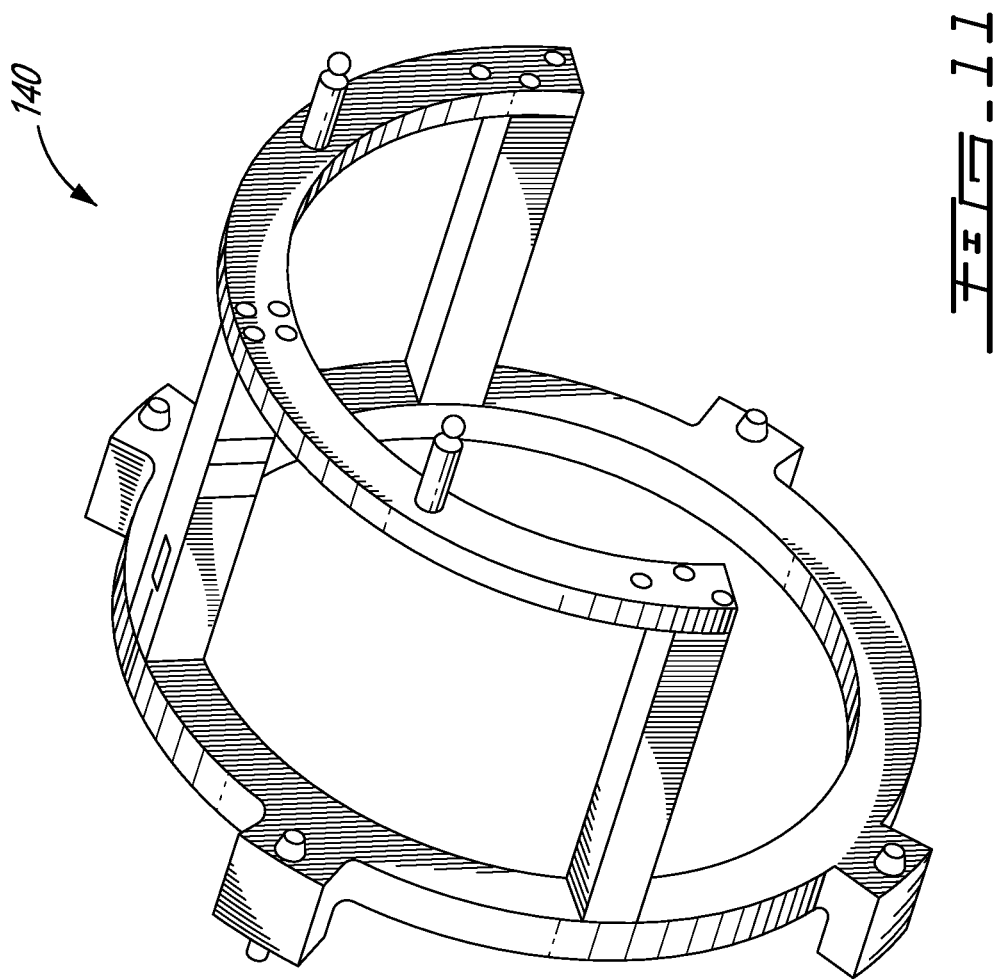

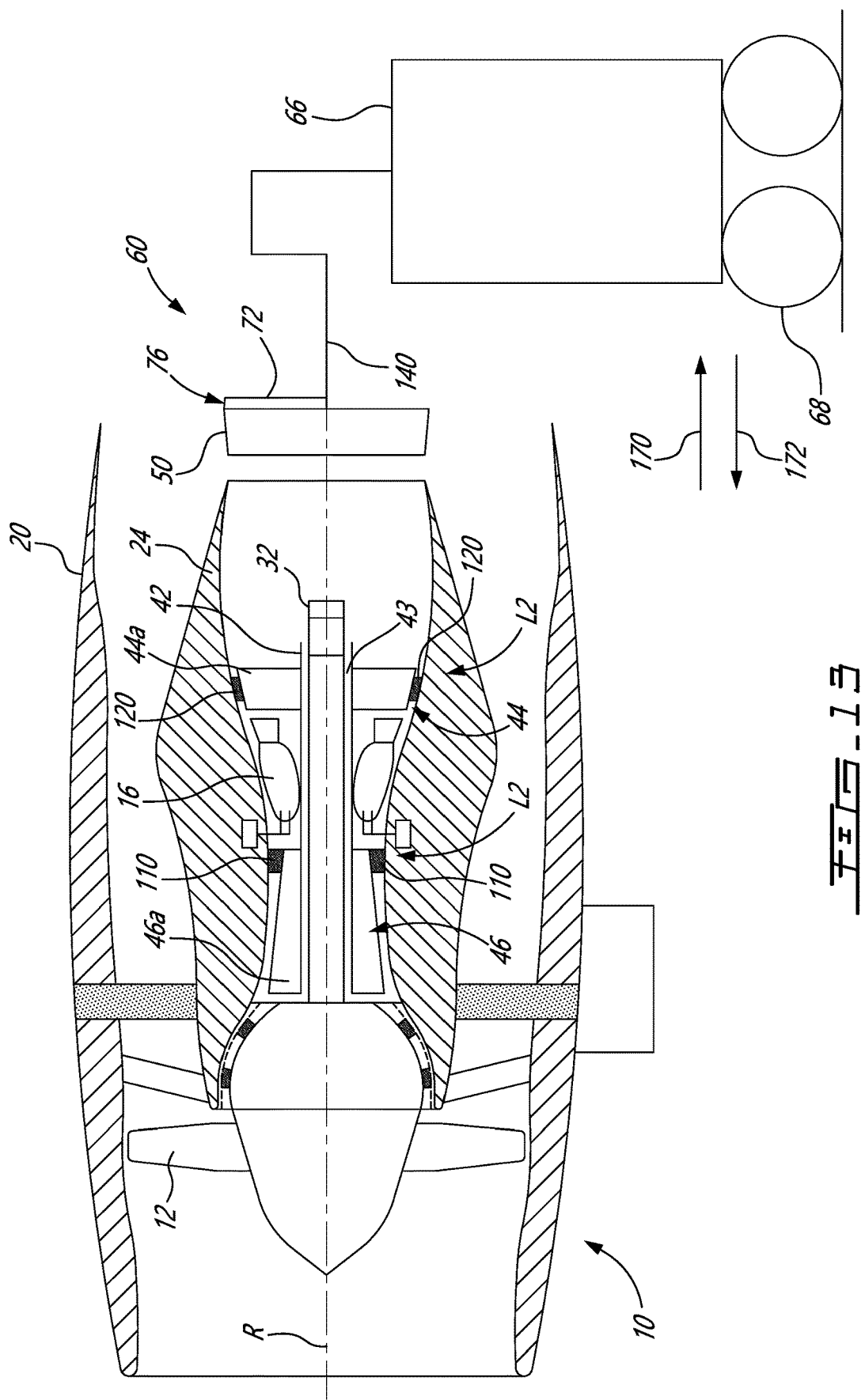

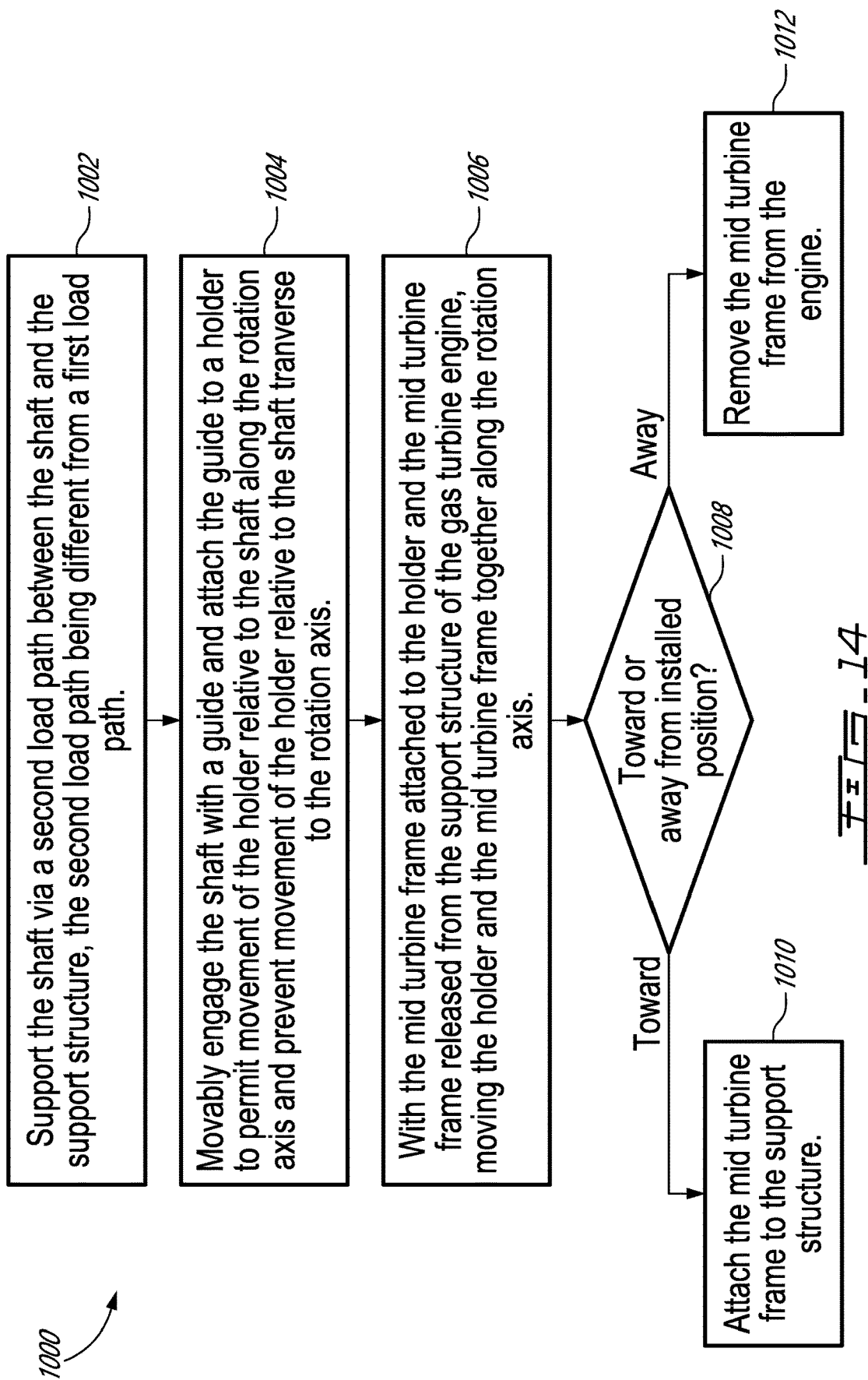

AIRCRAFT ENGINE REPAIR TOOL AND METHOD FOR REMOVAL AND INSTALLATION OF A MID TURBINE FRAME IN AN AIRCRAFT ENGINE

TECHNICAL FIELD

The disclosure relates generally to aircraft engines, and more particularly to the assembly and disassembly of aircraft engines.

BACKGROUND

Some turbofan aircraft engines (e.g., gas turbine engines) have a mid turbine frame located between a high-pressure turbine stage and a low-pressure turbine stage during operation of the gas turbine engine. The removal or installation of a mid turbine frame in a gas turbine engine, whether during initial assembly of the engine or during maintenance, is a time-consuming and expensive task that requires significant disassembly of the gas turbine engine in order to facilitate access and safe handling of the mid turbine frame. Improvement is desirable.

SUMMARY

In one aspect, the disclosure describes an assembly comprising:

a gas turbine engine including a mid turbine frame located between a first turbine rotor and a second turbine rotor in a turbine section of the gas turbine engine during operation of the gas turbine engine, the mid turbine frame being releasably attached to a support structure within the gas turbine engine, the gas turbine engine including a shaft supporting the first turbine rotor, the mid turbine frame rotatably supporting the shaft relative to the support structure about a rotation axis, the mid turbine frame defining a first load path between the shaft and the support structure, the second turbine rotor being uninstalled from the gas turbine engine; and an aircraft engine repair tool for installing and/or removing the mid turbine frame when the mid turbine frame is released from the support structure of the gas turbine engine, the aircraft engine repair tool including:

a stabilizer supporting the shaft via a second load path between the shaft and the support structure, the second load path being different from the first load path;

a holder attached to the mid turbine frame; and a guide movably engaged with the shaft and attached to the holder, the guide guiding movement of the holder and the mid turbine frame relative to the shaft along the rotation axis, and preventing movement of the holder and the mid turbine frame relative to the shaft transverse to the rotation axis when the mid turbine frame is released from the support structure.

In another aspect, the disclosure describes an aircraft engine repair tool for installing and/or removing a mid turbine frame from a gas turbine engine, the mid turbine frame being releasably attached to a support structure of the gas turbine engine, the mid turbine frame rotatably supporting a shaft relative to the support structure about a rotation axis, the mid turbine frame defining a first load path between the shaft and the support structure, the aircraft engine repair tool comprising:

a stabilizer configured to support the shaft via a second load path between the shaft and the support structure, the second load path being different from the first load path;

a holder attachable to the mid turbine frame; and a guide movably engageable with the shaft and attachable to the holder, the guide guiding movement of the holder and the mid turbine frame relative to the shaft along the rotation axis and preventing movement of the holder and the mid turbine frame relative to the shaft transverse to the rotation axis when the mid turbine frame is released from the support structure and attached to the holder, and when the holder is attached to the guide.

In a further aspect, the disclosure describes a method for installing a mid turbine frame on a gas turbine engine, or removing the mid turbine frame from the gas turbine engine, the mid turbine frame being located between a first turbine rotor and a second turbine rotor in a turbine section of the gas turbine engine during operation of the gas turbine engine, the mid turbine frame rotatably supporting a shaft about a rotation axis and defining a first load path between the shaft and a support structure of the gas turbine engine, the second turbine rotor being uninstalled from the gas turbine engine and the shaft supporting the first turbine rotor, the method comprising:

supporting the shaft via a second load path between the shaft and the support structure of the gas turbine engine, the second load path being different from the first load path;

movably engaging the shaft with a guide and attaching the guide to a holder to permit movement of the holder relative to the shaft along the rotation axis and prevent movement of the holder relative to the shaft transverse to the rotation axis;

with the mid turbine frame attached to the holder and the mid turbine frame released from the support structure of the gas turbine engine, moving the holder and the mid turbine frame together along the rotation axis toward or away from an installed position of the mid turbine frame in the support structure; and after moving the holder and the mid turbine frame along the rotation axis, either:

attaching the mid turbine frame to the support structure when the holder and the mid turbine frame have been moved toward the installed position of the mid turbine frame; and releasing the mid turbine frame from the support structure when the holder and the mid turbine frame have been moved away from the installed position of the mid turbine frame.

Further details of these and other aspects of the subject matter of this application will be apparent from the detailed description included below and the drawings.

DESCRIPTION OF THE DRAWINGS

Reference is now made to the accompanying drawings, in which:

FIG. 5 is a perspective view taken from a top, rear right side of a gauge tool of the aircraft engine repair tool;

FIG. 6A is a perspective view of four support pins of the aircraft engine repair tool;

FIG. 6B is a perspective view of a cross-section of the engine of FIG. 1 taken along cross-section line 6B-6B of FIG. 1, with the support pins of FIG. 6A attached to an inner casing of the engine of FIG. 1;

FIG. 7 is a perspective view taken from a top, rear, right side of a holder and a guide of the aircraft engine repair tool, with the holder being attached to an aft portion of the mid turbine frame of the engine of FIG. 1, and with the gauge tool of FIG. 6 engaging the guide;

FIG. 8 is a perspective view taken from a top, rear, right side of the guide of FIG. 7;

FIG. 9 is a perspective view taken from a top, rear, right side of an insert of the guide of FIG. 8;

FIG. 10 is a perspective view taken from a top, front, left side of the holder of FIG. 7;

FIG. 11 is a perspective view taken from a top, rear, right side of an extension frame for the holder of FIG. 7;

FIG. 13 is an axial cross-section view of the engine of FIG. 1, with the aircraft engine repair tool moving the mid turbine frame away from or toward an installed position of the mid turbine frame; and FIG. 14 is a flowchart of a method for installing a mid turbine frame on a gas turbine engine, or removing the mid turbine frame from the gas turbine engine.

DETAILED DESCRIPTION

The following disclosure describes aircraft engine repair tools and methods for installing a mid turbine frame in an aircraft (e.g., gas turbine) engine, or removing the mid turbine frame from the gas turbine engine with reduced disassembly of the gas turbine engine. The mid turbine frame may be a structural component of the aircraft engine and may be releasably attached to a support structure of the aircraft engine, such as an inner casing of the gas turbine engine. The mid turbine frame may be located between a high-pressure turbine rotor and low-pressure turbine rotor in a turbine section of the engine during operation of the engine. The gas turbine engine may further include a shaft supporting the high-pressure turbine rotor of the gas turbine engine. The mid turbine frame may rotatably support the shaft relative to the support structure about a rotation axis. The mid turbine frame may define a load path between the shaft and the support structure.

In some embodiments, the aircraft engine repair tool described herein may include a stabilizer for supporting the shaft via a different (substitute) load path, a holder attachable to the mid turbine frame, and a guide for guiding the movement of the holder and the mid turbine frame relative to the shaft along the rotation axis. The movement of the holder together with the mid turbine frame along the rotation axis may be guided by the guide so as to permit relatively accurate and stable movement of the holder and mid turbine frame over a relatively long reach inside the gas turbine engine. The stability of the movement of the holder within the gas turbine engine provided by the guide may, in some embodiments, facilitate safe access and handling of the mid turbine frame without requiring significant disassembly of the gas turbine engine. Embodiments of the aircraft engine repair tools described herein may be suitable for use in the field for removable/installation of a mid turbine frame in an aircraft-mounted engine (e.g., on wing).

The term "attached" as used herein may include both direct attachment (in which two elements that are attached to each other contact each other) and indirect attachment (in which at least one additional intermediate element is disposed between the two elements).

The term "connected" or "coupled" may include both direct connection or coupling (in which two elements contact each other) and indirect connection or coupling (in which at least one additional element is located between the two elements).

Aspects of various embodiments are described through reference to the accompanying drawings.

Figure 1:
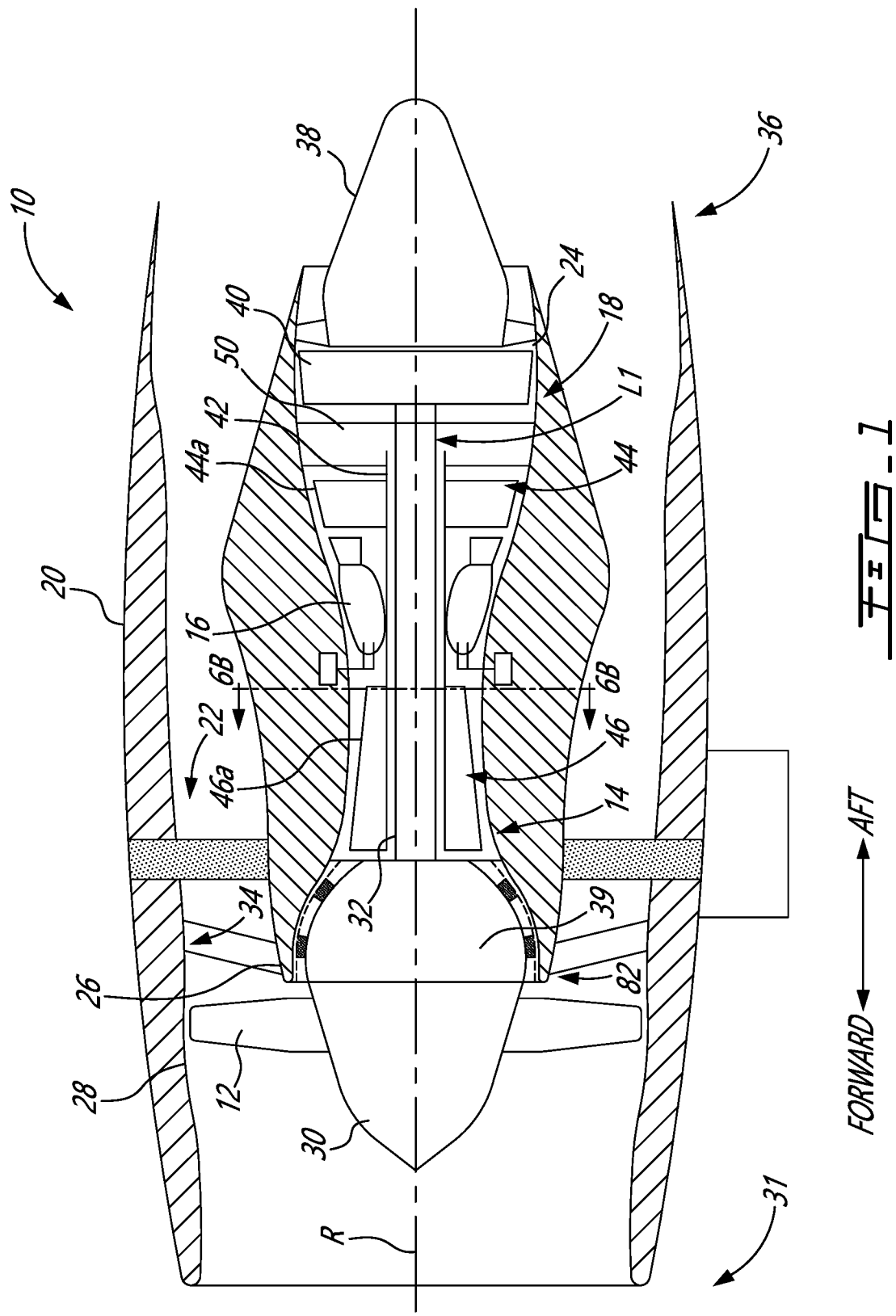
FIG. 1 shows an axial cross-section view of a turbo-fan gas turbine engine including a mid turbine frame.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may include bypass duct 20 and core gas path 22 that are separated by inner casing 24. Flow splitter 26 may be disposed at a forward end of inner casing 24. Engine 10 may include fan case 28 inside which fan 12 is rotatably mounted. At a forward end 31 of engine 10, nose cone 30 may be disposed forward of fan 12 and releasably attached for common rotation with fan 12. Engine 10 may include bypass stator 34, which may be an airfoil-shaped strut providing structural support within engine 10. At an aft end 36 of engine 10, a turbine exhaust case 38 may be disposed rearward of turbine section 18.

Engine 10 may be a dual spool gas turbine engine. Engine 10 may include low-pressure shaft 32 to which fan 12, compressor boost module 39 and low-pressure turbine stage 40 are drivingly coupled thereto. Compressor boost module 39 may be a compressor rotor assembly including one or more initial stages of compressor 14.

Engine 10 may include high-pressure shaft 42 to which high-pressure turbine stage 44 and high-pressure compressor 46 are drivingly coupled thereto. High-pressure turbine stage 44 may include a plurality of turbine rotors 44a. High-pressure compressor 46 may include a plurality of compressor rotors 46a. Low-pressure shaft 32 and high-pressure shaft 42 may be mechanically uncoupled to permit separate rotation. Low-pressure shaft 32 and high-pressure shaft 42 may be mounted coaxially for rotation about rotation axis R. As best seen in FIG. 1, low-pressure shaft 32 may extend inside high-pressure shaft 42. A radial gap 43 (FIG. 2) may be defined between low-pressure shaft 32 and high-pressure shaft 42.

Engine 10 may include a mid turbine frame 50, sometimes referred to as an "interturbine frame", located between high-pressure turbine stage 44 and low-pressure turbine stage 40. In some embodiments, mid turbine frame 50 may be of a type as disclosed in U.S. Pat. No. 8,061,969, which is incorporated herein by reference. Mid turbine frame 50 may be releasably attached (e.g., fastened) to inner casing 24. In some embodiments, mid turbine frame 50 could be releasably attached to other support structure(s) within engine 10. Mid turbine frame 50 may include bearing housing 52 (FIG. 4) to support one or more bearings rotatably supporting shafts 32, 42 to rotate about the rotation axis R. Mid turbine frame 50 may be a load bearing structure transferring loads from shafts 32, 42 to inner casing 24 via load path L1 (FIG. 1). Mid turbine frame 50 may include inner ring 54 supporting bearing housing 52, and one or more struts 56 extending radially outwardly to outer ring 58. Outer ring 58 may be releasably attached to inner casing 24 using a plurality of fasteners accessible from aft end 36 of engine 10 when low-pressure turbine stage 40 and turbine exhaust case 38 are removed from engine 10. Load path L1 may thus include, without being limited to, bearing housing 52, strut(s) 56 and outer ring 58 of mid turbine frame 50.

Figure 2:
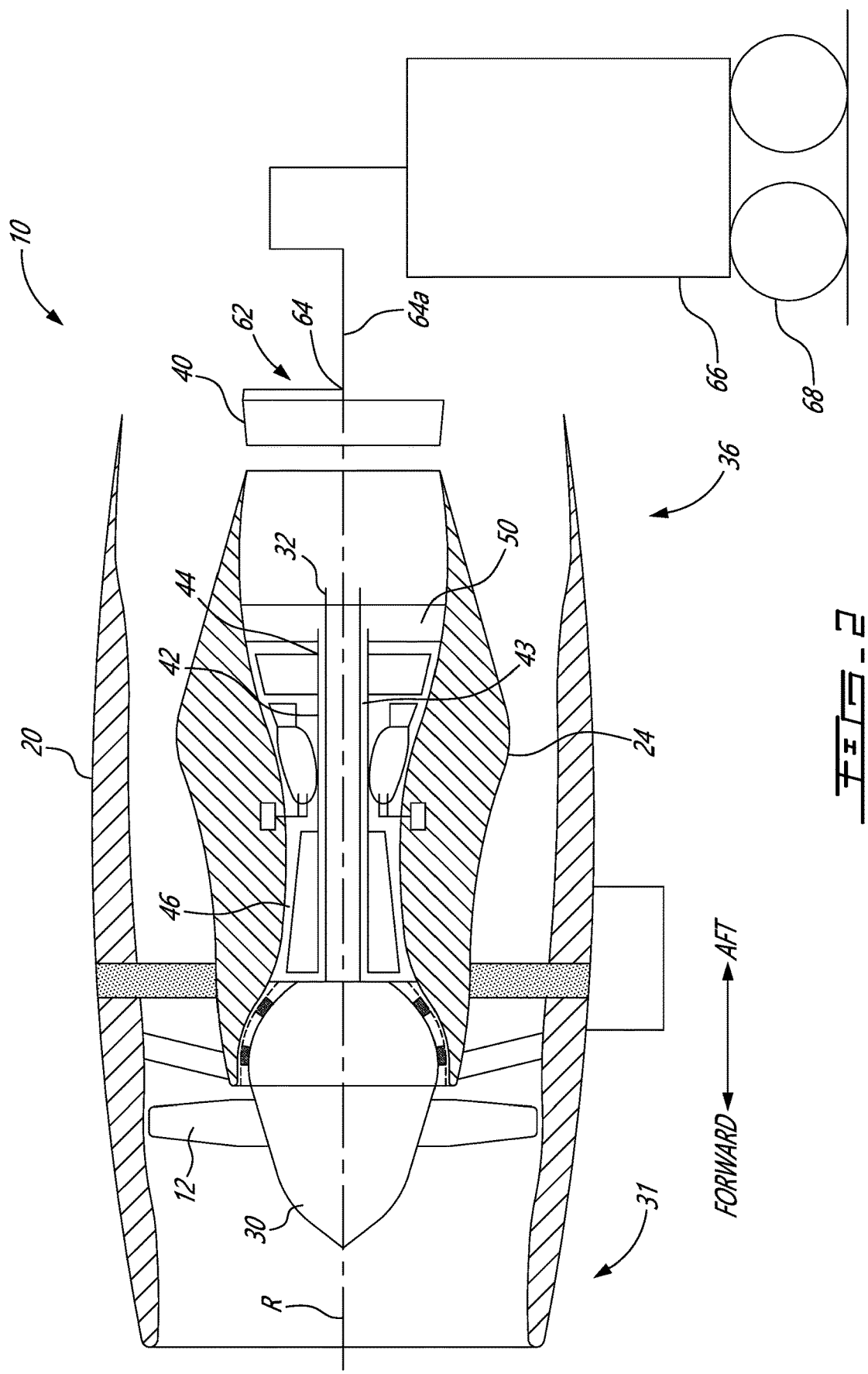
FIG. 2 shows the axial cross-section view of the turbo-fan gas turbine engine of FIG. 1, with a low-pressure turbine stage being removed therefrom.
Figure 3:
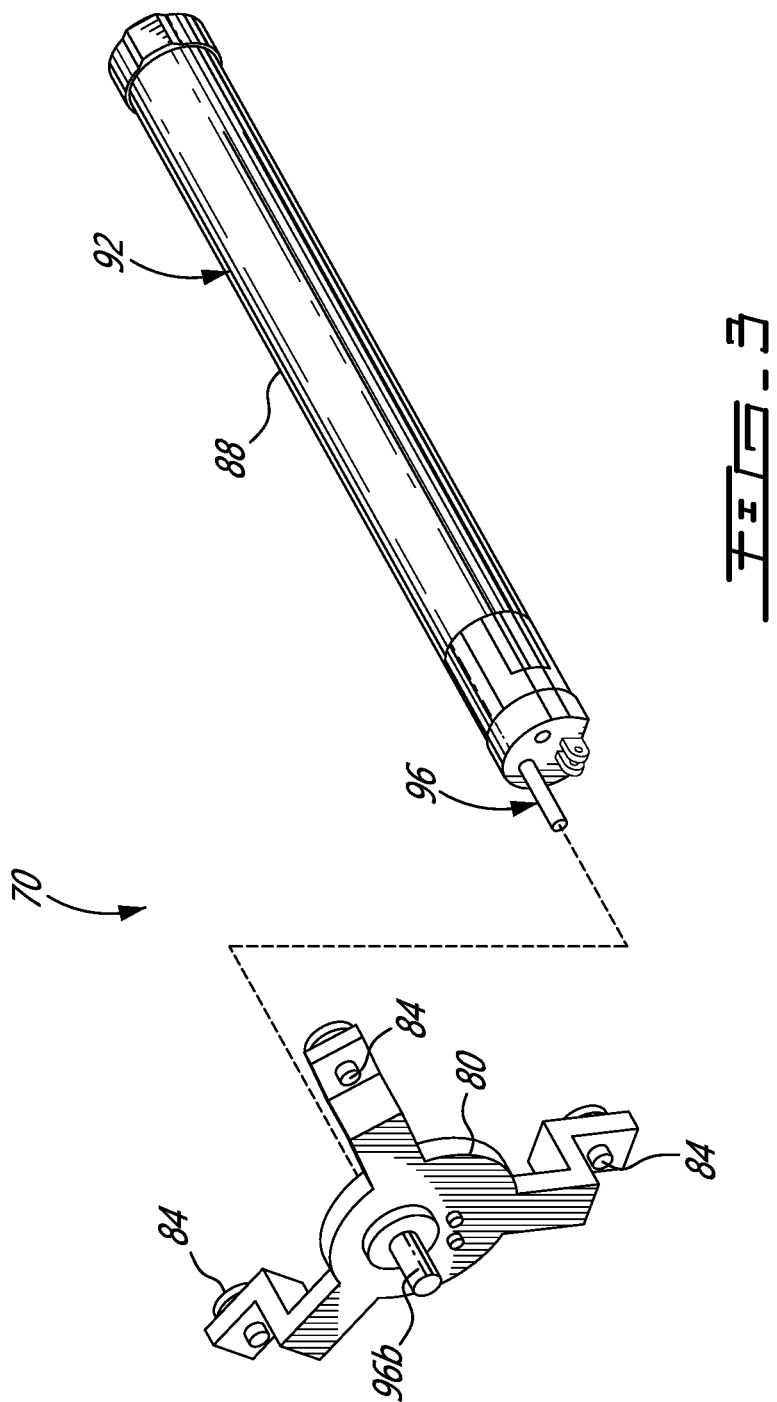
FIG. 3 is a partially exploded, perspective view taken from a top, front, right side of components of an exemplary stabilizer of an aircraft engine repair tool.

Referring to FIG. 2, before installing and/or removing the mid turbine frame 50 from engine 10 using aircraft engine repair tool 60, turbine exhaust case 38 and low-pressure turbine stage 40 may be removed from engine 10. As schematically shown in FIG. 2, low-pressure turbine stage 40 may be removed using low-pressure turbine stage support 62. Low-pressure turbine stage support 62 may include an interface 64 adapted for attachment to an aft portion of the low-pressure turbine stage 40. Low-pressure turbine stage support 62 may further include extension frame 64a adapted to hold and position support 62 for attachment to low-pressure turbine stage 40 from aft end 36 of the engine 10 whilst leaving outer bypass duct 20 on the engine 10. Low-pressure turbine stage support 62 may be supported by (e.g. connected to) a suitable machinery mover 66 (schematically shown in FIG. 2) such as a stand, wheeled cart, articulated arm or overhead support for example. As shown in FIG. 2, machinery mover 66 may be a wheeled cart including floor-engaging wheels 68, brakes and/or adjustable leveling feet. When low-pressure turbine stage 40 is removed from the engine 10, aft portion of mid turbine frame 50 and aft ends of low-pressure shaft 32 and high-pressure shaft 42 may be accessible.

Referring to FIGS. 3 to 8, aircraft engine repair tool 60 (shown in FIG. 12) may include stabilizer 70, holder 72 and guide 74. As will be described in detail below, stabilizer 70 may support shafts 32, 42 via substitute load path L2 defined between shafts 32, 42 and inner casing 24. Load path L2 may be different from load path L1 provided by mid turbine frame 50. Holder 72 may have an interface 76 attachable to the mid turbine frame 50. Guide 74 may be movably engaged with shafts 32, 42 and attached to holder 72. Guide 74 may guide movement of the holder 72 and mid turbine frame 50 when attached to holder 72 relative to shafts 32, 42 along the rotation axis R and may prevent movement of holder 72 and mid turbine frame 50 relative to shafts 32, 42 transverse to rotation axis R when mid turbine frame 50 is released from inner casing 24.

Figure 4:
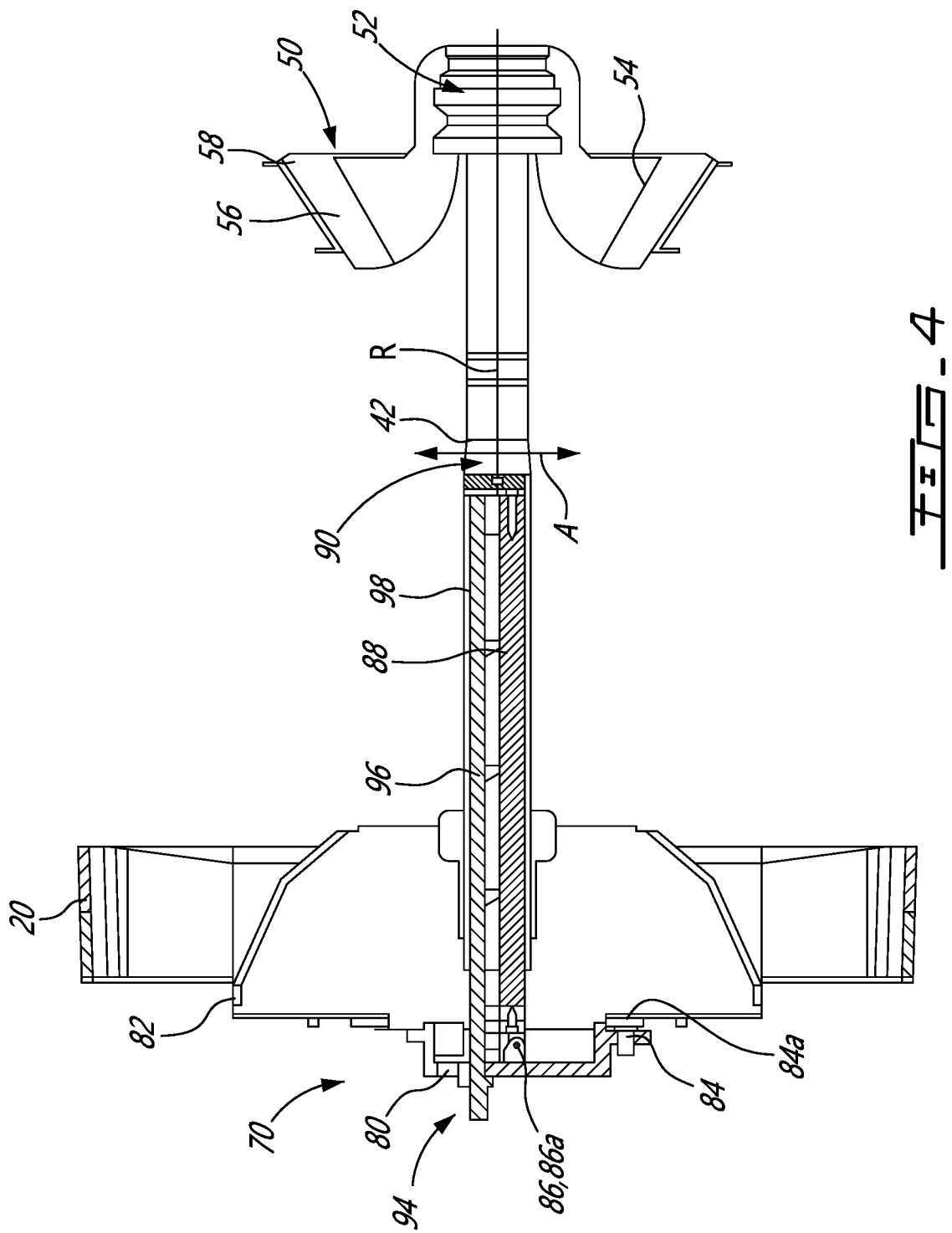
FIG. 4 is an axial cross-section view of the components of the stabilizer of FIG. 3, with a front case and bypass duct of the engine of FIG. 1, and with a high-pressure shaft and mid turbine frame of the engine of FIG. 1.

Referring to FIGS. 3 to 7, stabilizer 70 will be generally described. Stabilizer 70 may have a base 80 attachable to a forward structure of engine 10. For example, base 80 may be attached to a forward structure 82 (e.g., casing) of engine 10 (FIGS. 1 and 4). More particularly, base 80 may have a three-prong, Y-shape configuration when viewed along rotation axis R, and may include fasteners 84 connectable to attachment points 84a provided on forward structure 82 of engine 10 (FIG. 4). Base 80 may thus be disposed forward of shafts 32, 42. Base 80 may further include a pivot 86 defining pivot axis 86a. An arm 88 may be pivotally coupled to base 80 at pivot 86 and pivotable about pivot axis 86a.

Arm 88 may be sized and dimensioned to be inserted in a bore 90 of high-pressure shaft 42 from a forward portion (end) of high-pressure shaft 42. In some embodiments, arm 88 may include a film 92 provided on a surface of arm 88 engaging bore 90 of high-pressure shaft 42. Film 92 may be composed of relatively soft material(s) to protect bore 90 of high-pressure shaft 42 when engaged by arm 88. Stabilizer 70 may further include actuator 94 for adjusting an angular position of arm 88 relative to base 80 about pivot axis 86a. In the present embodiment, actuator 94 includes a screw 96 extending in a threaded hole 98 defined in arm 88. Screw 96 may be vertically offset from pivot axis 86a. Upon selective rotation of screw 96, screw 96 threadingly engages hole 98 and arm 88 selectively pivots about pivot axis 86a. In some embodiments, when screw 96 is tightened, an aft (i.e., distal) end of arm 88 is raised along arrow A in FIG. 4, and an angular position of arm 88 relative to base 80 about pivot axis 86a can be selected. When arm 88 is raised and engages high pressure shaft 42, high-pressure shaft 42 may be moved upwardly. Conversely, when the aft end of arm 88 is lowered along arrow A in FIG. 4, high-pressure shaft 42 may be moved downwardly and arm 88 may disengage high pressure shaft 42. When high-pressure shaft 42 is supported by one or more bearings provided in bearing housing 52 of mid turbine frame 50, a load supported by the one or more bearings can be supported by arm 88 as arm 88 is raised and engages high-pressure shaft 42. In other words, arm 88 may selectively lift high-pressure shaft 42 and define with base 80 at least a portion of substitute load path L2. Other types of actuators 94 (e.g. electromechanical actuator) could be used in other embodiments.

Referring to FIG. 5, stabilizer 70 may further include gauge tool 100. Gauge tool 100 is adapted for insertion into bore 90 of high-pressure shaft 42 from aft portion of high-pressure shaft 42. Gauge tool 100 may have engagement portion 101 including expanders 101a adapted for selectively engaging high-pressure shaft 42. Expanders 101a may be selectively extended or retracted upon selective rotation of knob 101b. When expanders 101a are selectively extended for engaging high-pressure shaft 42, engagement portion 101 is centered in bore 90 of high-pressure shaft 42 and gauge tool 100 may be used to measure movement of high-pressure shaft 42. Gauge tool 100 may include vertical movement dial indicator 102a, and horizontal movement dial indicator 102b. Dial indicators 102a, 102b may measure movement of high-pressure shaft 42 along respective orientations. For instance, when high-pressure shaft 42 is raised or lowered using base 80, arm 88 and actuator 94, vertical movement dial indicator 102a may measure vertical movement of high-pressure shaft 42. Gauge tool 100 may also be adapted for engagement with guide 74 (FIG. 7).

Referring to FIGS. 6A, 6B and 13, stabilizer 70 may further include one or more support pins 110 attachable to inner casing 24. As best seen in FIG. 6A, each of the four support pins 110 includes a body 112 attachable to inner casing 24, and a pin 114 selectively movable relative to the body 112 using a knob 116. Each pin 114 extends through holes defined in inner casing 24, and each pin 114 extend radially to abut compressor rotor 46a of high-pressure compressor 46. Since the compressor rotor 46a is supported by high-pressure shaft 42, when support pins 110 are attached to inner casing 24 and their respective pin 114 abuts compressor rotor 46a, support pins 110 may assist in selecting and maintaining a position of high-pressure turbine stage 44 and shafts 32, 42 relative to rotation axis R. Support pins 110 may also be used to center shafts 32, 42 horizontally and/or vertically when used in conjunction with gauge tool 100. Support pins 110 may be attached to inner casing 24 to selectively abut compressor rotor 46 located in aft portion of high-pressure compressor 46. In addition and as schematically shown in FIG. 13, support pins 110 may selectively define a portion of load path L2 and support at least some of the load born by mid turbine frame 50. In other words, at least some of the load born by mid turbine frame 50 may be selectively born by support pins 110.

Referring to FIG. 13, in some embodiments, stabilizer 70 may further include one or more shims 120 being insertable between inner casing 24 and rotor 44a of high-pressure turbine stage 44 of engine 10. The shims 120 can be inserted in engine 10 from aft end 36 and through struts 56 of mid turbine frame 50 before being disposed between inner casing 24 and rotor 44a. The thickness and number of shims 120 may be selected to fill a radial space between inner casing 24 and blade tips of rotor 44a at one or more (e.g., three or more) locations. When disposed between inner casing 24 and rotor 44a, shims 120 may also define a portion of load path L2 (as schematically shown in FIG. 13). In some embodiments where one or more shims 120 are disposed between inner casing 24 and rotor 44a, the use of base 80, arm 88 and actuator 94 could be omitted to define load path L2. It is also contemplated that shims 120 could be used in conjunction with support pins 110 described above, and thus load path L2 between shafts 32, 42 and inner casing 24 could be defined by shims 120 and support pins 110.

Referring to FIG. 10, interface 76 of holder 72 may have a generally circular shape. Interface 76 may include one or more attachment points 130 adapted for attachment to an aft portion of mid-turbine frame 50.

Referring to FIG. 11, aircraft engine repair tool 60 may include optional extension frame 140 attachable to holder 72 between interface 76 and machinery mover 66. Extension frame 140 may serve as an axial spacer for providing sufficient reach of attachment points 130 into engine 10. In various situations, extension frames 140 of various sizes may be used. Disassembly of engine 10 may thus be reduced for installing and/or removing mid turbine frame 50 using aircraft engine repair tool 60 compared to other tools and techniques. Alternatively, no extension frame 140 may be required in some situations.

Figure 12:
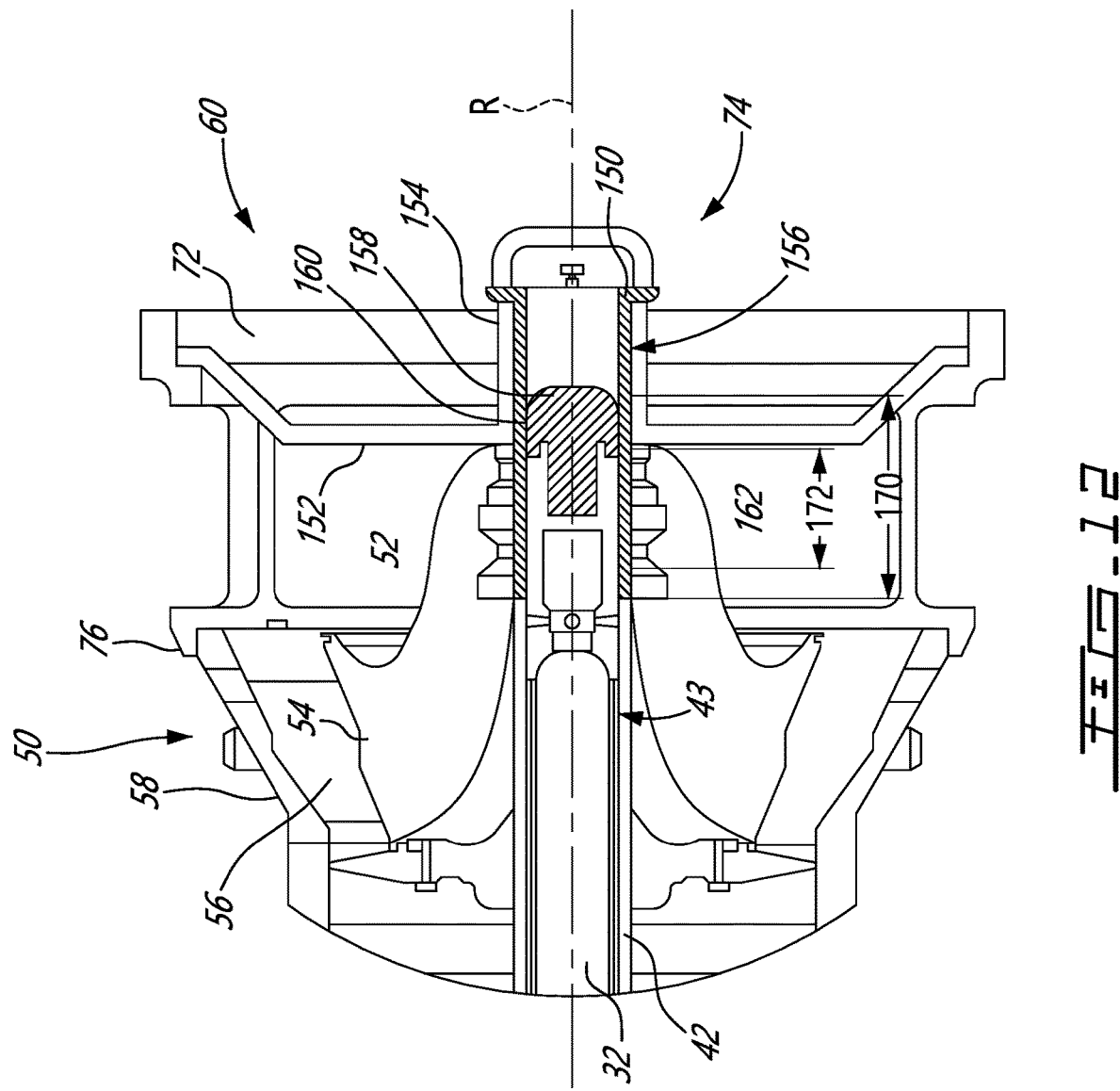
FIG. 12 is an axial cross-section view of components of the aircraft engine repair tool attached to the mid turbine frame of the engine of FIG. 1.

Referring to FIGS. 8 and 9, guide 74 may include insert 150 being sized and dimensioned for insertion into radial gap 43 defined between low-pressure shaft 32 and high-pressure shaft 42. Insert 150 may extend over low-pressure shaft 32 and may engage high-pressure shaft 42. Insert 150 may also engage bearing housing 52 of mid turbine frame 50 and assist in supporting bearings within bearing housing 52 during installation and/or removal of mid turbine frame 50 from engine 10. Guide 74 may further include one or more spokes 152 extending radially from hub 154. In the present embodiment, guide 74 has four spokes 152. Each spoke 152 may be attached to holder 72. Hub 154 defines a cylindrical aperture 156 sized and dimensioned to receive insert 150 therein. Guide 74 may further include plug 158. Plug 158 may be threadingly connectable to aft portion of low-pressure shaft 32 (FIG. 12). Plug 158 may further have an outer portion 160 slidably engageable to inner wall 162 of insert 150. Length 170 of inner wall 162 may be selected to provide support to guide 74 and holder 72 over a desired distance along rotation axis R. For example, length 170 may be selected to be equal or greater than length 172 between bearing housing 52 and aft end of low-pressure shaft 32 so that mid turbine frame 50 may be supported by insert 150 until bearing housing 52 has cleared aft end of low-pressure shaft 32. When mid turbine frame 50 is attached to holder 72, spokes 152 are attached to holder 72, insert 150 extends through hub 154, plug 158 is connected to low-pressure shaft 32 and insert 150 extends within radial gap 43, guide 74 may guide movement of holder 72 and mid turbine frame 50 relative to shafts 32, 42 along rotation axis R and prevent movement of holder 72 and mid turbine frame 50 relative to shafts 32, 42 transverse to rotation axis R. Slidable engagement of outer portion 160 of plug 158 with inner wall 162 of insert 150 may further assist in preventing movement transverse to rotation axis R of hub 154, spokes 152, holder 72 and mid turbine frame 50. In other words, guide 74 may allow movement of holder 72 and mid turbine frame 50 in a direction being parallel to rotation axis R while preventing holder 72 and mid turbine frame 50 from moving in directions transverse to rotation axis R. Such guided movement of holder 72 and mid turbine frame 50 may assist in protecting seals and bearings within bearing housing 52 during installation and/or removal of mid turbine frame 50.

FIG. 14 is a flowchart illustrating method 1000 for installing mid turbine frame 50 on engine 10, or removing mid turbine frame 50 from the engine 10. Method 1000 may be performed using aircraft engine repair tool 60 as described above or some other tool(s). Aspects of method 1000 may be combined with aspects of aircraft engine repair tool 60 and/or with other methods and/or actions described herein. In various embodiments, method 1000 may include: supporting shafts 32, 42 of engine 10 via load path L2 between shafts 32, 42 and the support structure (in the present embodiment, inner casing 24), load path L2 being different from load path L1 (see block 1002); movably engaging guide 74 with shafts 32, 42 with guide 74 and attaching guide 74 to holder 72 so that movement of holder 72 relative to shafts 32, 42 along rotation axis R is permitted and movement of holder 72 relative to shafts 32, 42 transverse to rotation axis R is prevented (see block 1004); with mid turbine frame 50 attached to holder 72 and mid turbine frame 50 released from inner casing 24 of engine 10, moving holder 72 and mid turbine frame 50 together along rotation axis R toward or away from an installed position of mid turbine frame in inner casing 24 (see block 1006).

When mid turbine frame 50 is being moved toward the installed position, this may be indicative of mid turbine frame 50 being installed into engine 10. Hence, after moving holder 72 and mid turbine frame 50 along rotation axis R and toward the installed position (see block 1008), mid turbine frame 50 may be attached to inner casing 24 (see block 1010).

When mid turbine frame 50 is being moved away from the installed position, this may be indicative of mid turbine frame 50 being released from engine 10. Hence, after moving holder 72 and mid turbine frame 50 along rotation axis R and away from the installed position (see block 1012), mid turbine frame 50 may be removed from engine 10 (see block 1014).

As explained above, engine 10 may be a turbofan gas turbine engine and method 1000 may further include removing turbine exhaust case 38 and low-pressure turbine stage 40 from engine 10 before attaching holder 72 to mid turbine frame 50. In some embodiments, depending on the configuration of engine 10 and on the type of mid turbine frame 50 being attached to holder 72, other component(s) may need to be removed from engine 10 to permit the removal or installation of mid turbine frame 50 using aircraft engine repair tool 60. Accordingly, method 1000 may include removing such components and reinstalling such components at the appropriate time.

Referring to FIGS. 4 to 13, an illustrative scenario describing removal of mid turbine frame 50 using tool 60 will be described.

When turbine exhaust case 38 and low-pressure turbine stage 40 are removed from engine 10, holder 72 is moved into position for attachment to mid turbine frame 50 using attachment points 130. Spokes 152 of guide 74 are attached to holder 72, insert 150 is inserted into radial gap 43. Insert 150 is then removed from radial gap 43. Gauge tool 100 is inserted into aft end of high-pressure shaft 42, expanders 101a are selectively extended for engaging high-pressure shaft 42 and centering engagement portion 101 inside bore 90, and dial indicators 102a, 102b are zeroed. At forward end 31 of engine 10, stabilizer 70 has arm 88 inserted into bore 90 and base 80 is attached to forward structure 82 using fasteners 84 and attachment points 84a. Screw 96 is rotated to raise arm 88 upwardly such that arm 88 engages high-pressure shaft 42. Arm 88 is raised to lift shaft 42 until a maximum vertical travel on the gauge tool 100 is determined using dial indicator 102a. Screw 96 is rotated to lower arm 88 downwardly and shaft 42 is again supported by mid turbine frame 50 via load path L1. A radial displacement value is determined from a value of maximum travel indicative of an amount of play available in the bearing supporting shaft 42. A selected radial displacement value may correspond to a mid point along the determined maximum vertical travel so as to correspond to a position where the bearing supporting shaft 42 is unloaded.

Support pins 110 are then attached to inner casing 24 and pins 114 extend radially through inner casing 24 and remain spaced from compressor rotor 46a.

Stabilizer 70 has screw 96 rotated to lift arm 88 until shaft 42 is moved upwardly by the selected radial displacement value using dial indicator 102a. Pins 114 are selectively extended using knobs 116 to move high-pressure shaft 42 horizontally until the radial displacement value is reached using dial indicator 102b. At this time, high-pressure shaft 42 is centralized in mid turbine frame 50 where the bearing(s) supporting high-pressure shaft 42 is/are unloaded and the load initially born by mid turbine frame 50 is transferred to load path L2 provided by stabilizer 70 and support pins 110.

Expanders 101a are retracted to disengage from high-pressure shaft 42. Gauge tool 100 is removed from aft end of high-pressure shaft 42. Insert 150 is inserted back into radial gap 43. Plug 158 is threadingly connected to aft end of low-pressure shaft 32. Fasteners and brackets attaching mid turbine frame 50 to inner casing 24 are removed for releasing mid turbine frame 50 from inner casing 24. While leaving bypass duct 20 untouched, machinery mover 66 is moved into position to reach inside bypass duct 20 and attached to holder 72. Optionally, extension frame 64a may be interconnected between machinery mover 66 and holder 72. When holder 72 is attached to machinery mover 66, machinery mover 66 is moved in a direction parallel to rotation axis R away from the installed position of the mid turbine frame 50 so as to remove mid turbine frame 50 from engine 10, as indicated by arrow 180.

In an alternative illustrative scenario, base 80 and arm 88 are omitted and one or more shims 120 are disposed between rotor 46a and inner casing 24 to move high-pressure shaft 42 vertically. Support pins 110 are then attached to inner casing 24 and pins 114 are selectively extended to move high-pressure shaft 42 horizontally. Gauge tool 100 may optionally be used to determine vertical and horizontal movement of high-pressure shaft 42 and assist in centralizing high-pressure shaft 42 within mid turbine frame 50. As shims 120 and support pins 110 define load path L2, mid turbine frame 50 is unloaded and ready to be removed from engine 10 as described above.

The installation process is the reverse of the above-described removal process. During installation process, mid turbine frame 50 is attached to holder 72 and supported by machinery mover 66. Arrow 182 indicates the mid turbine frame 50 being moved in a direction parallel to rotation axis R toward the installed position using holder 72 and machinery mover 66. When holder 72 and mid turbine frame 50 have been moved toward the installed position, mid turbine frame 50 may be attached to inner casing 24.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. An assembly comprising:
   a gas turbine engine including a mid turbine frame located between a first turbine rotor and a second turbine rotor in a turbine section of the gas turbine engine during operation of the gas turbine engine, the mid turbine frame being releasably attached to a support structure within the gas turbine engine, the gas turbine engine including a shaft supporting the first turbine rotor, the mid turbine frame rotatably supporting the shaft relative to the support structure about a rotation axis, the mid turbine frame defining a first load path between the shaft and the support structure, the second turbine rotor being uninstalled from the gas turbine engine; and
   an aircraft engine repair tool for installing and/or removing the mid turbine frame when the mid turbine frame is released from the support structure of the gas turbine engine, the aircraft engine repair tool including:
      a stabilizer supporting the shaft via a second load path between the shaft and the support structure, the second load path being different from the first load path;
      a holder attached to the mid turbine frame; and
      a guide movably engaged with the shaft and attached to the holder, the guide being configured to guide a movement of the holder and the mid turbine frame relative to the shaft along the rotation axis, and to prevent a movement of the holder and the mid turbine frame relative to the shaft transverse to the rotation axis when the mid turbine frame is released from the support structure.

2. The assembly as defined in claim 1, wherein the stabilizer comprises:
   an arm inserted in a bore of the shaft;
   a base attached to the support structure of the gas turbine engine, the arm being pivotally coupled to the base about a pivot axis;
   an actuator for adjusting an angular position of the arm relative to the base about the pivot axis; and
   the second load path being defined via the arm engaging the shaft, and the base.

3. The assembly as defined in claim 2, wherein the gas turbine engine is a turbofan gas turbine engine having a forward end, and the base is disposed forward of the shaft.

4. The assembly as defined in claim 1, wherein the stabilizer comprises a support pin extending between the support structure and a compressor rotor of the gas turbine engine supported by the shaft.

5. The assembly as defined in claim 1, wherein the stabilizer comprises a shim disposed between the support structure and the first turbine rotor of the gas turbine engine.

6. The assembly as defined in claim 1, wherein the holder has an interface attached to an aft portion of the mid turbine frame.

7. The assembly as defined in claim 1, comprising a machinery mover supporting the holder, and the holder being movable along the rotation axis via the machinery mover.

8. The assembly as defined in claim 1, wherein the shaft comprises a first shaft supporting the first turbine rotor and a second shaft supporting the second turbine rotor, the second shaft extends inside the first shaft, and the guide extends over the second shaft and engages the first shaft.

* * * * *